United States Patent [19]

Kramer

[11] Patent Number: 4,834,409
[45] Date of Patent: May 30, 1989

[54] PERSONAL MOBILITY VEHICLE WITH EXPANSIBLE WHEEL BASE AND WHEEL TRACK

[76] Inventor: DuWayne E. Kramer, 1800 Merriam La., Mission, Kans. 66202

[21] Appl. No.: 108,584

[22] Filed: Oct. 13, 1987

[51] Int. Cl.$^4$ .................. B62D 61/12; B62K 13/00
[52] U.S. Cl. ................................ 180/209; 180/906; 180/907; 280/304.1
[58] Field of Search .................. 180/209, 906, 907; 280/282 WC

[56] References Cited

U.S. PATENT DOCUMENTS 3,502,165  3/1970  Matsukata ..................... 180/209
4,570,739  2/1986  Kramer ......................... 180/216

OTHER PUBLICATIONS

Brochure of Everest and Jennings entitled "Mabie, Premier 3 Wheeler".
1985 Product Catalog from Alpha Unlimited, with Photograph labeled Prior Art Device "A".
Brochure of Ortho Kinetics, Inc. entitled "The Bravo Model 434", with photograph labeled Prior Art Device B.
Brochure of Ortho Kinetics, Inc. entitled "Colt".

Primary Examiner—Kenneth R. Rice
Attorney, Agent, or Firm—Kokjer, Kircher, Bradley, Wharton, Bowman & Johnson

[57] ABSTRACT

A personal mobility vehicle includes a main frame unit with front and back ends, both with wheels thereon, a steerable front wheel, an operator's seat and vehicle controls. A pair of spaced rear wheels are mounted at the back end of the vehicle and include moveably mounted axles supporting the rear wheels and connected to arms with mechanisms for selectively angularly moving the axles outwardly and inwardly of the main frame unit to vary wheel base and wheel track. A motor is connected to the wheel support structure for remotely varying the wheel base and wheel track. A separate drive motor is operatively connected to the wheels for movement of the vehicle.

10 Claims, 3 Drawing Sheets

PERSONAL MOBILITY VEHICLE WITH EXPANSIBLE WHEEL BASE AND WHEEL TRACK

FIELD OF THE INVENTION

The present invention relates to personal mobility vehicles, and more particularly to a self propelled vehicle including an expansible wheel base.

BACKGROUND OF THE INVENTION

Persons with partial and total walking disabilities have traditionally relied upon wheel chairs for locomotion. Wheel chairs generally have relatively widely spaced wheels for lateral stability and to comfortably accommodate the occupant. Persons in wheel chairs can move with relative ease in places such as hospitals which are usually provided with extra wide doors and halls and inclined ramps between vertically displaced levels. However, private homes and work places are generally not planned specifically to accommodate wheel chairs. While wheel chairs are generally resistant to lateral tipping they are often designed for tipping backwards so that an attendant pushing a patient in a wheel chair can tip the front wheels up to negotiate obstacles such as steps, thresholds and the like. While such a configuration is useful when the wheel chair is pushed by an attendant, the design presents some hazards when the wheel chair occupant attempts to wheel himself up a ramp. Further, there is a degree of social stigma attached to wheel chairs such that wheel chair occupants are sometimes shunned as "handicapped".

In order to overcome some of the problems associated with wheel chairs, the medical equipment industry has developed small personal mobility vehicles as an alternative. Such vehicles generally have a pair of rear wheels, a steerable front wheel, are powered, and in general have the appearance of a down sized golf cart. The track of the rear wheels is generally narrower than that of wheel chairs, the wheel base is generally longer, and the vehicles are generally designed for tight turning radii such that the vehicles are more maneuverable than wheel chairs and therefore, more useful in places which are not specifically designed for wheel chair use.

Because such personal mobility vehicles generally require a narrow wheel track to pass through doorways of normal width, and also utilize a generally short wheel base for ease of maneuverability in tight turning radii, the vehicle may lack stability and be easy to roll over to one side with the resulting of injury to the operator. One known vehicle, in order to overcome such maneuverability and stability problems employs an expansible rear wheel mechanism for controlling the length of the vehicle between the wheel base, and for widening and narrowing the wheel track. This mechanism is entirely hand operated and requires the user to lift the rear of the vehicle up, remove pins and slide in or out telescoping shafts on which the axles are mounted. This is generally unsatisfactory because such vehicles are often used by the aged or otherwise infirm who may not have the required strength to accomplish the task. Because the mechanism of changing the wheel base and wheel track is manual and requires stopping and manipulating components, the user usually elects to forego such adjustments and maintains the vehicle in a narrow track, short wheel base configuration in order to make sharp turns and maneuver through doorways. Consequently, any advantage of the expansible wheel base and wheel track mechanism is lost because of the difficulty of use.

SUMMARY OF THE INVENTION

The present invention attempts to optimize both the stability and maneuverability of personal mobility vehicles by providing a mechanism for expansion and contraction of the wheel base and of the wheel track. The mechanism is powered and has controls readily excessible to the operator so that adjustments can be simply and quickly made without resort to dismounting, lifting and manual adjustment. Moreover, the vehicle may be either front wheel driven or rear wheel driven and still utilize the expansible wheel base and wheel track concept.

OBJECTS OF THE INVENTION

The principal objects of the present invention are: to provide a personal mobility vehicle to facilitate locomotion by partially handicapped persons; to provide an improved personal mobility vehicle which is relatively light and compact and may be conveniently driven into a van for use of movement; to provide such a personal mobility vehicle which is light in weight, is sturdy and stable in use; to provide such a vehicle with an expansible wheel base; to provide such a vehicle with an expansible wheel track; to provide such a vehicle having an expansible wheel base and wheel track in which either the front wheels or rear wheels may be powered; to provide such a vehicle having powered controls for expansion and contraction of the wheel base and wheel track; to provide such a vehicle including control switches which are conveniently placed; to provide such a vehicle which is economical to manufacture, durable and safe in operation, and which is particularly well adapted for its intended purpose.

Other objects and advantages of this invention will become apparent from the following description taken in connection with the accompanyng drawings wherein are set forth by way of illustration and example, certain embodiments of this invention.

DETAILED DESCRIPTION OF THE PREFERRED EMBODIMENTS

Figure 1:
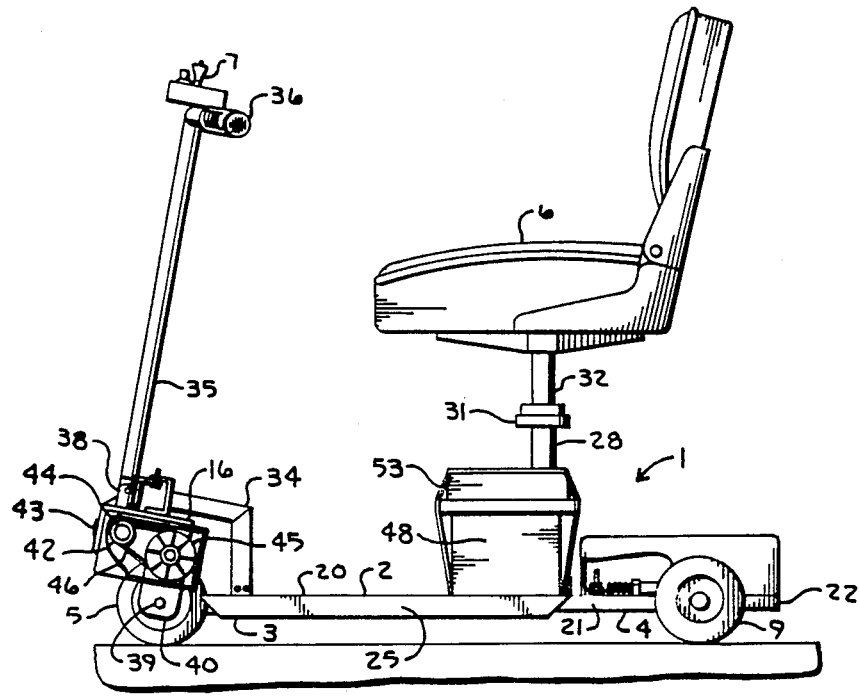
FIG. 1 is a side elevational view of a personal mobility vehicle according to the present invention.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIG. 1, generally designates a personal mobility vehicle 1 including a main frame unit 2 including a front end 3 and a back end 4, both with wheels thereon and with the front end 3 including a steerable front wheel 5. The personal mobility vehicle 1 also includes an operator's seat 6 and vehicle control means 7.

A pair of spaced rear wheels 9 and 10 are mounted at the back end 4 and include movably mounted axles 11 and 12 supporting the rear wheels 9 and 10 and connected to arms 13 and 14 with means for selectively moving the axles 11 and 12 outwardly and inwardly of the main frame unit 2 to vary wheel base and wheel track.

Motor means 15 are connected to the means for selectively moving the axles 11 and 12 and include motor control means for operation of the motor means 15. A drive means, such as the drive means 16, is operably connected to either the front wheels or the back wheels for movement of the vehicle.

In a first embodiment, represented by FIGS. 1, 2, 3, and 4, the main frame unit 2 includes a floor pan unit 20 with an underlying center beam 21 and front and rear lateral members (not shown). The center beam 21 is of square tubular cross section and extends from just behind the front wheel 5 and projects rearwardly from the rear end of the floor pan unit 20 to form a rear wheel support beam 22, also of square tubular form. The floor pan unit 20 is attached to the front and rear lateral members and the center beam 21 by bolts or welding and is of sheet metal such as aircraft aluminum. Side portions of the floor pan unit 20 may be carpeted for a finished appearance. Outer edges 25 of the floor pan unit 20 are upturned to strengthen the edges and for safety reasons should be less than one inch high to avoid tripping the rider of the vehicle during entry and exit.

A seat tube 28 is welded to a tube support plate 29 which is in turn bolted or otherwise secured to the floor pan unit 20. A swivelable collar 31 on the seat tube 28 permits swiveling of the seat 6 during entry and exit and includes separable parts whereby an upper seat post 32 and seat 6 may be removed in partial disassembly of the vehicle 1 for ease of transport.

A steering gear supporting strut 34 extends forwardly and upwardly of the front end 3 of the floor pan unit 20 and includes a steering post 35 extending upwardly and with handle bars 36 mounted at the top of the post. In the illustrated example, the vehicle control means 7 is located medially of the handle bars 36 and may include an accelerator lever.

A bearing assembly spindle 38 extends between the steering gear supporting strut 34 and the steering post 35 for relative rotation and a wheel front axle 39 is rotatably mounted on a fork 40.

In the embodiment shown in FIGS. 1 through 4, the personal mobility vehicle 1 is front wheel drive and includes an exemplary front wheel drive unit 42, FIG. 1, which includes a motor 43 powering a first sprocket 44 and connected to a second sprocket 45 by a toothed belt 46. The second sprocket 45 is in turn connected to a third sprocket (not shown) enclosed by the fork 40 and driving a second tooth belt (not shown) connected to a fourth sprocket (not shown) secured to the front wheel axle 39 and causing the front wheel 5 to be driven by the motor 43. The front wheel drive motor control components are incorporated in the vehicle control means 7.

The braking of the vehicle is accomplished both by electrical resistance from the drive motor 43 and the vehicle may also be provided with a caliper brake.

The wheel drive motor 43 and the motor means 15 are powered by rechargeable batteries within battery packs or cases 48 and 49. The preferred type of battery is of the gelled cell type to avoid leakage of battery chemicals should the battery pack be upset and for the ease of maintenance of such cells. The batteries are of the size employed on small boats as starting motors and weights about twenty pounds. The case or packs 48 and 49 encloses and protects the battery and has a socket 51, FIG. 4, to receive a connector of a battery cable 52. The socket 51 also enables connection of a battery charger (not shown) for replenishing the battery charge.

The battery case 48 has a handle or strap 53 for lifting and carrying the battery for convenience in recharging same.

Switching logic for controlling the speed and direction of the wheel drive motor 43 is provided by relays (not shown) housed within a relay box 54 which is mounted on the main frame unit 2, such as adjacent the seat tube 28. The main on/off switch 55, FIG. 1, is mounted on the relay box 54 and the battery cable 52 extends from the relay box 54.

Figure 2:
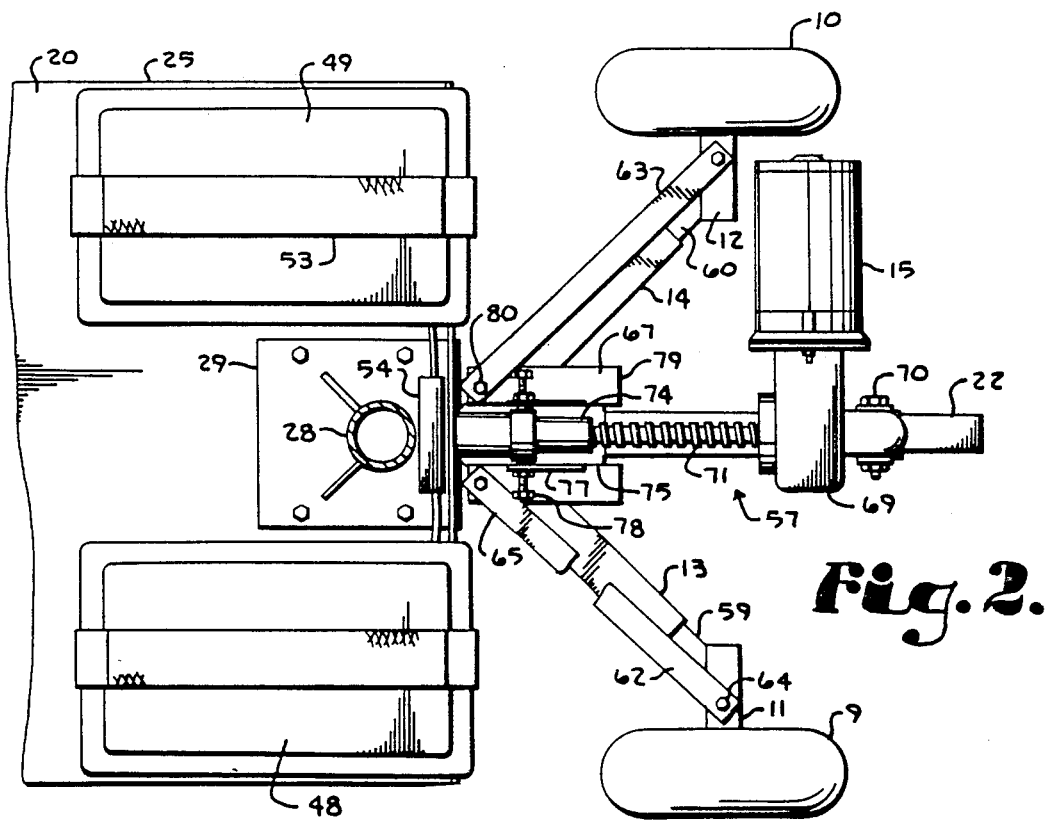
FIG. 2 is an enlarged, fragmentary, plan view of a rear end portion of the personal mobility vehicle.
Figure 3:
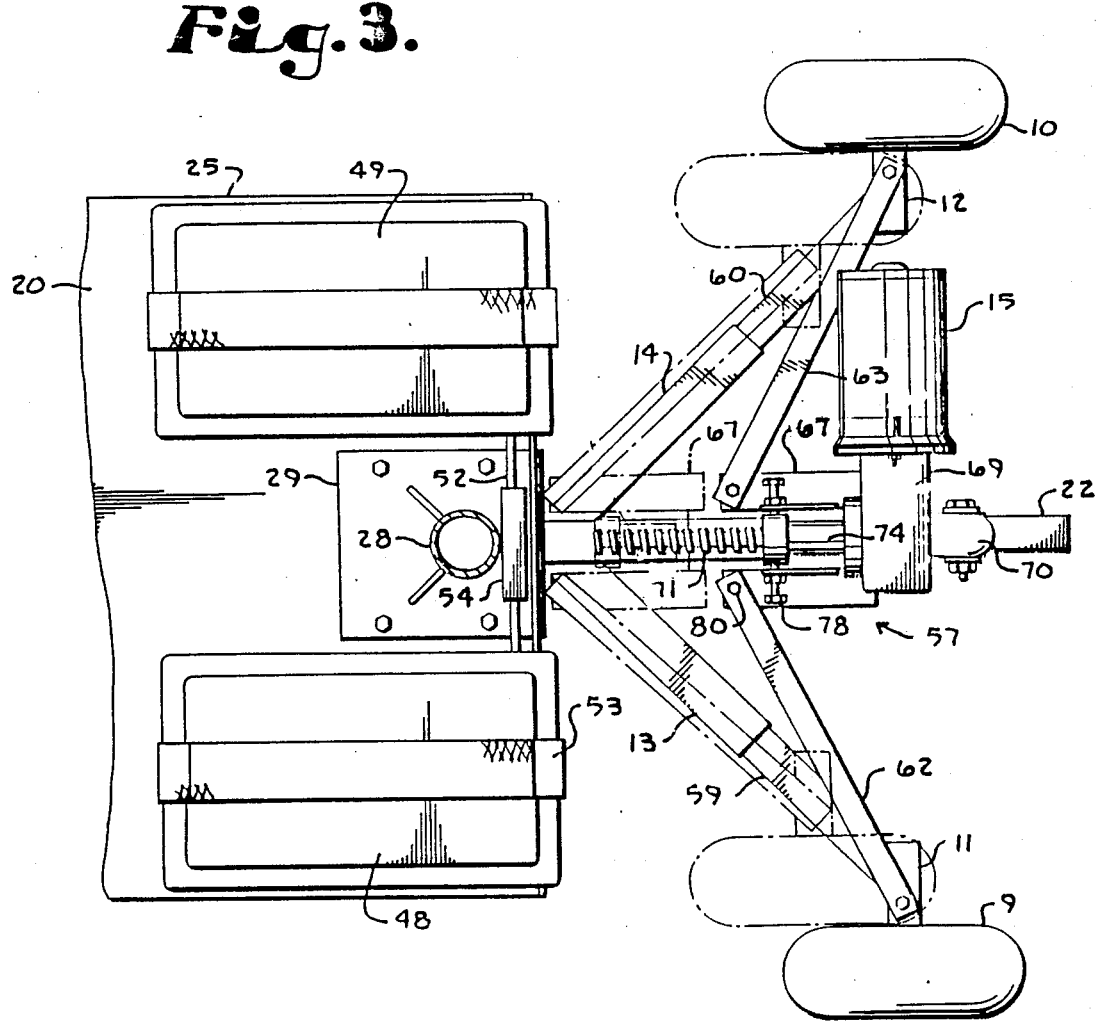
FIG. 3 is a fragmentary, plan view of the rear end of a personal mobility vehicle and showing expansion and contraction of the wheel base and wheel track.
Figure 4:
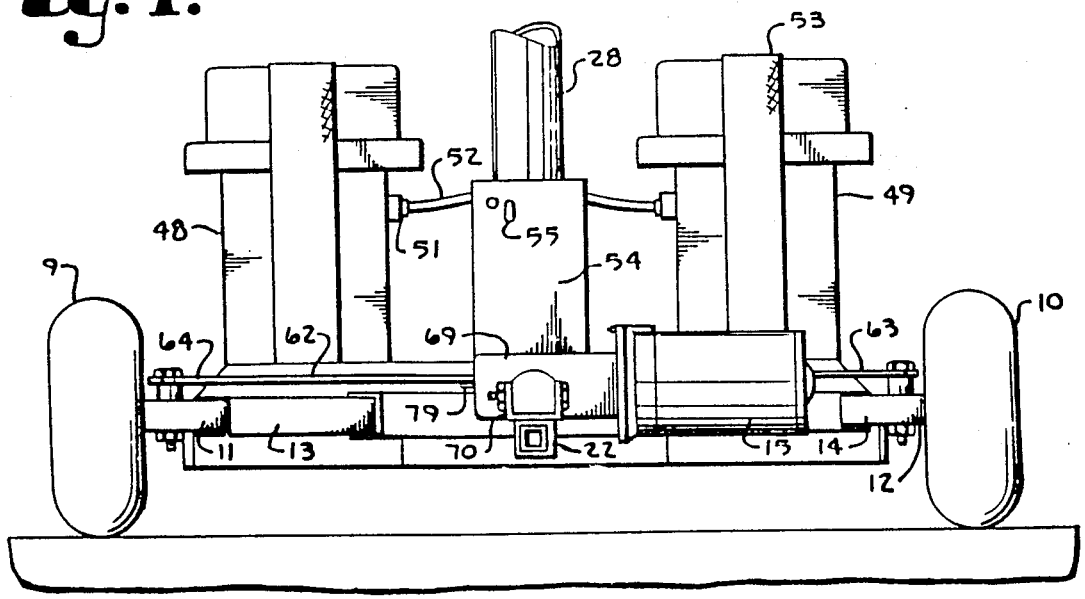
FIG. 4 is a fragmentary, rear elevational view of the vehicle.

The vehicle 1 includes means 57 for varying wheel track and base, and in the illustrated examples, FIGS. 2, 3 and 4, the rear wheels 9 and 10 are made to expand in wheel base, that is length or distance from the front wheel to the back wheels and also made to expand in track, that is, the dimension transverse to the longitudinal axis of the vehicle and between the rear wheels 9 and 10. The means 57 automatically vary wheel base and track, and in the illustrated example, FIGS. 2 through 4, the means 57 include the rearwardly extending wheel support beam 22, and the arms 13 and 14 secured and diverging froma forward end of the support beam 22 and from opposite sides thereof so that the arms 13 and 14 are generally arrayed about the support beam 22 in forty-five degree angles. Telescoping arms 59 and 60 are fitted into the arms 13 and 14 and have distal ends secured to the respective axles 11 and 12 in a fixed angular relationship. Accordingly, it can be discerned that as the telescoping arms 59 and 60 move into and out of the arms 13 and 14, the wheel base and wheel track varies accordingly. To cause automatic varying of the wheel base and wheel track, linkage arms 62 and 63 have first ends 64 pivotally affixed to the respective axles 11 and 12 and second ends 65 pivotally affixed to a traveling bracket assembly 67 moveably mounted on the rear wheel support beam 22. For automatic actuation of the means 57, the motor 15 includes a right angle drive unit 69. The motor 15 and drive unit 69 is affixed to the support beam 22 by a mounting bracket 70. A screw shaft 71 extends parallel to the support beam 22 and has one end mounted within the drive unit 69 for rotation. The traveling bracket assembly 67 includes a threaded tube 74 mounted on the distal end of the screw shaft 71 and to which a sleeve 75 is mounted. The sleeve 75 has ears 77 connected by bolts 78 to the threaded tubes 74. Flanges 79 extend outwardly from the sleeve 75 on opposite sides thereof and the linkage arm second end 65 is attached to the respective flange 79 by a pivot pin 80. The motor 15 is connected by appropriate electrical lines (not shown) to the relay box 54 and bidirectional controls therefore may be included in the vehicle control means 7 mounted atop the steering post 35.

Upon actuation of the control means, the motor 15 causes the screw shaft 71 to rotate in a selected direction, causing the traveling bracket assembly 67 to move longitudinally on the shaft 71 whereby the linkage arms 62 and 63 push out or pull in the telescoping arms 59 and 60 and move the axles 11 and 12 and rear wheel 9 and 10 therewith to dependently vary wheel base and wheel track.

The arrangement shown in FIGS. 2, 3 and 4 is a front wheel drive, rear wheel expansible arrangement. In FIGS. 5, 6, 7 and 8, two embodiments of a rear wheel drive, wheel drive expansible arrangement are disclosed including a second embodiment, FIGS. 5 and 6, and a third embodiment, FIGS. 7 and 8.

Figure 5:
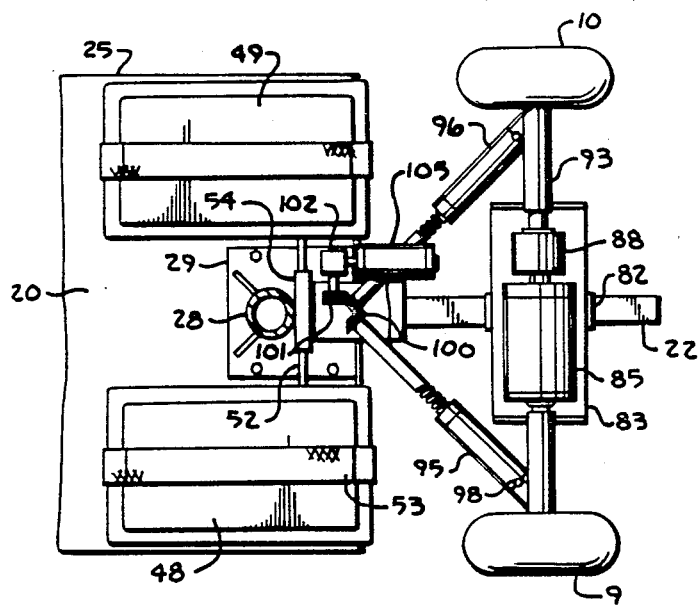
FIG. 5 is a fragmentary, rear plan view of a second embodiment of the vehicle.
Figure 6:
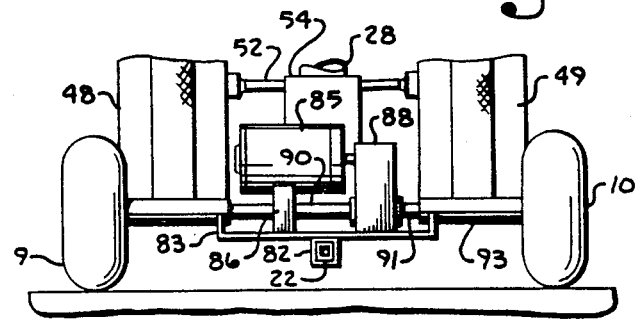
FIG. 6 is a fragmentary, rear elevation view of the embodiment shown in FIG. 5.

The rear wheel drive, rear wheel expansible arrangement shown in FIGS. 5 and 6 includes the aforementioned rear wheel support beam 22 extending from the floor pan unit 20. A sleeve 82 is mounted on the beam 22 thereon and carrys a motor support bracket 83 on which a wheel drive motor 85 is mounted upon a stand 86. The wheel drive motor 85 transmits power through a right angle drive unit 88 and through a differential gear means contained within the unit 88 to left and right axle shafts 90 and 91 respectively mounted in housings 93.

The motor support bracket 83 carrying the wheel drive motor 85 and the axle shafts 90 and 91 is moved forwardly and rearwardly on the support beam 22 by an extensible assembly including left and right jack screws 95 and 96 having distal ends with a pivotal mount 98 connection to the ends of the housings 93 and with forward ends of the jack screws 95 and 96 terminating in pinion gears 100 which intermesh, each with the other, and are in turn driven by a spur gear 101 extending from a right angle drive unit 102 driven by a motor 105. The motor 105 is used for rotation of the jack screws 95 and 96; the screws cause the wheel base to expand or contract and the wheel track dependently to expand and contract. The left and right axle shafts 90 and 91, fitted into the housings 93, include interior splines meshed each with the other so that lengthening or shortening of the effective length of the jack screws 95 and 96 cause the housings 93 to retract inwardly or expand outwardly on the shafts 90 and 91, thereby causing variance of the wheel track.

Figure 7:
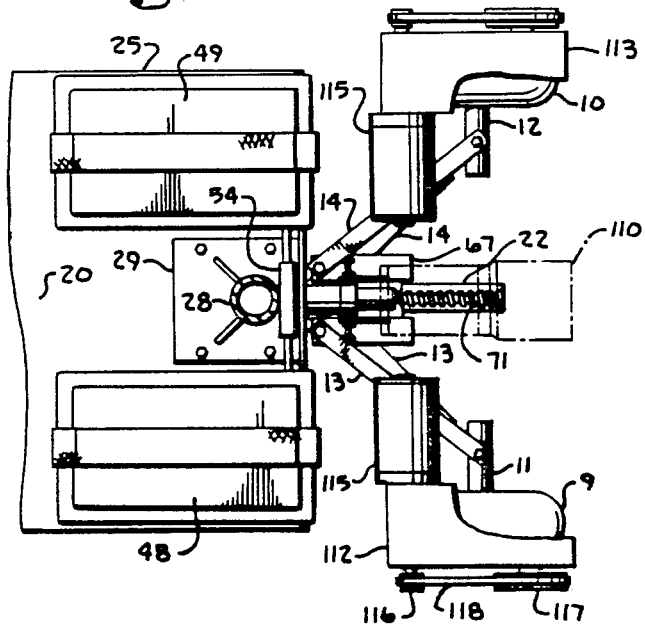
FIG. 7 is a fragmentary, rear plan view of a third embodiment of the personal mobility vehicle.
Figure 8:
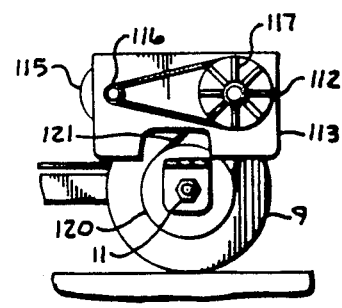
FIG. 8 is a fragmentary, side elevational view of a portion of the vehicle shown in FIG. 7.

A third embodiment is shown in connection with FIGS. 7 and 8 wherein the wheel expansion and contraction mechanism 107, the mechanism shortening or lengthening both wheel base and wheel track, is substantially the same as the expansion and contraction means 57 shown in connection with FIGS. 2, 3 and 4. The exception for the embodiment shown in FIGS. 7 and 8 as motor 110 and is mounted with its rotor shaft (not shown) aligned with the screw shaft 71 and directly connected thereto for movement of the traveling bracket assembly 67 on the shaft. As this embodiment also includes rear wheel expansion and contraction, rear wheel drive means 112 are mounted adjacent each wheel 9 and 10 and include a wheel shroud 113 to which a wheel drive motor 115 is mounted and connected by a first pulley 116 to a second, larger pulley 117 by a belt 118. The pulley 117 is a double pulley and includes an inner sheave (not shown) driving pulley 120 mounted about the axle 11 or 12 of the wheel 9 or 10 by a belt 121.

As the wheel base and wheel track expansion and contraction mechanism 107 operates, the wheels 9 and 10, FIGS. 7 and 8, will move inwardly and outwardly accordingly and are individually powered by the rear wheel drive means 112 mounted adjacent each of the rear wheels 9 and 10.

In all three of these embodiments, the appropriate electrical connections to both the wheel drive motors and the wheel base expansion and contraction motors are connected to the vehicle control means 7 located within easy reach of the operator so that merely by moving a switch, the operator can adjust the wheel base and wheel track to expand same for increased vehicle stability or contract the wheel base and wheel track for easier manueverability, as through doors or narrow corridors and passageways. Adjustment of wheel base and wheel track can be accomplished while the vehicle is moving forward and the operator need not depart the seat for any manual adjustment or manual manipulation of parts, bolts or the like.

It is to be understood that while several embodiments of this invention have been illustrated and described, the invention is not to be limited to the specific arrangements shown except insofar as such arrangements are included in the following claims.

What is claimed and desired to be secured by Letters Patent is as follows:

1. A personal mobility vehicle comprising:
   (a) a main frame unit including a front end and a back end, said front end including a steerable front wheel and means for steering, said main frame unit including an operator's seat, and vehicle control means associated therewith;
   (b) a pair of spaced rear wheels mounted at said back end and including moveably mounted axles supporting said rear wheels and further including means for selectively moving said axles outwardly and inwardly and forwardly and rearwardly with reference to said main frame unit;
   (c) motor means connected to said means for selectively moving said axles and including motor control means for operation thereof; and
   (d) drive means operably connected to at least a said wheel for movement of said vehicle.

2. A personal mobility vehicle comprising:
   (a) a main frame unit including a front end and a back end, said front end including a steerable front wheel and means for steering, said main frame unit including an operator's seat, and vehicle control means associated therewith;
   (b) drive means connected to said front wheel for powered rotation thereof;
   (c) a pair of spaced rear wheels mounted at said back end and including moveably mounted axles supporting said rear wheels and further including means for selectively moving said axles outwardly and inwardly and forwardly and rearwardly with reference to said main frame unit; and
   (d) motor means connected to said means for selectively moving said axles and including motor control means for operation thereof.

3. The personal mobility vehicle set forth in claim 2 wherein:
   (a) a support beam extends rearwardly at said main frame unit rear end and a traveling ball and screw assembly is mounted on said support beam;
   (b) a set of opposed telescoping arms have inner ends connected to the support beam and outer ends connected to said axles in fixed angular relationship thereto;

(c) a set of opposed swingably mounted link rods have inner ends connected to said traveling ball and outer ends connected to said axles; and (d) said motor means is operably connected to said screw for rotation of same.

4. The personal mobility vehicle set forth in claim 2 wherein:

(a) a support beam extends rearwardly at said main frame unit and an extensible assembly is mounted on said support beam;

(b) a set of opposed telescoping arms have inner ends connected to said support beam and outer ends connected to said axles in fixed angular relationship thereto;

(c) a set of opposed swingably mounted link rods have inner ends connected to said extensible assembly and outer ends connected to said axles; and (d) said motor means is operably connected to said extensible assembly for operation thereof.

5. A personal mobility vehicle comprising:

(a) a main frame unit including a front end and a back end, said front end including a steerable front wheel and means for steering, said main frame unit including an operator's seat, and vehicle control means associated therewith;

(b) a pair of spaced rear wheels mounted at said back end and including moveably mounted axles supporting said rear wheels and with means for selectively moving said axles outwardly and inwardly and forwardly and rearwardly with respect to said main frame unit;

(c) motor means connected to said means for selectively moving said axles outwardly and inwardly and forwardly and rearwardly and including motor control means for operation thereof; and drive means connected to said rear wheels for powered rotation thereof.

6. The personal mobility vehicle set forth in claim 5 wherein:

(a) a support beam extends rearwardly at said main frame unit and an extensible assembly is mounted on said support beam;

(b) wheel support arms extend from said main frame unit and include a set of opposed telescoping arms having inner ends connected to said support beam and outer ends connected to said axles in fixed angular relationship thereto, and a set of opposed swingably mounted link rods having inner ends connected to said extensible assembly and outer rods connected to said axles; and (c) said motor means is operably connected to said extensible assembly for operation thereof.

7. A personal mobility vehicle comprising:

(a) a main frame unit including a front end and a back end, the back end having a pair of spaced rear wheels coupled therewith and the front end having a steerable front wheel and means for steering, said main frame unit including an operator's seat and vehicle control means associated therewith;

(b) drive means connected to at least one of said rear wheels for powered rotation thereof;

(c) moveably mounted axles supporting said rear wheels; and (d) an adjustable mechanism coupled with said axles for selectively moving said axles outwardly and inwardly and forwardly and rearwardly with reference to said main frame unit.

8. The personal mobility vehicle set forth in claim 7 wherein:

(a) said adjustable mechanism includes a set of opposed telescoping arms having inner ends coupled with said main frame unit and outer ends coupled with said axles in fixed angular relationship thereto, and a set of opposed swingably mounted link rods having inner ends coupled with said main frame unit and outer ends connected with said axles.

9. The personal mobility vehicle set forth in claim 8 wherein:

(a) a support beam extends rearwardly at set main frame unit back end and said adjustable mechanism includes an extensible assembly mounted on said support beam; and (b) said inner ends of the link rods are coupled with said extensible assembly, whereby extension and retraction of said extensible assembly causes movement of said axles outwardly and inwardly and forwardly and rearwardly of said main frame unit.

10. The personal mobility vehicle set forth in claim 9 including motor means coupled with said extensible assembly for causing extension and retraction thereof and including motor control means for operation of the motor means.

* * * * *